(12) United States Patent
Cecchin

(10) Patent No.: US 12,240,148 B2
(45) Date of Patent: Mar. 4, 2025

(54) METHOD FOR PRODUCTION OF ARTICLES AND SEMI-FINISHED PRODUCTS MADE OF CELLULOSE ACETATE

(71) Applicant: H2C S.R.L., Rome (IT)

(72) Inventor: Orfeo Cecchin, Bassano del Grappa (IT)

(73) Assignee: H2C S.R.L., Rome (IT)

( * ) Notice: Subject to any disclaimer, the term of this patent is extended or adjusted under 35 U.S.C. 154(b) by 252 days.

(21) Appl. No.: 17/776,377

(22) PCT Filed: Nov. 10, 2020

(86) PCT No.: PCT/IB2020/060555
§ 371 (c)(1),
(2) Date: May 12, 2022

(87) PCT Pub. No.: WO2021/105807
PCT Pub. Date: Jun. 3, 2021

(65) Prior Publication Data
US 2022/0396009 A1    Dec. 15, 2022

(30) Foreign Application Priority Data
Nov. 26, 2019  (IT) .................. 102019000022128

(51) Int. Cl.
| | |
|---|---|
| B29B 17/04 | (2006.01) |
| B29C 43/00 | (2006.01) |
| B29C 43/02 | (2006.01) |
| B29C 43/52 | (2006.01) |
| B29K 1/00 | (2006.01) |
| B29K 105/26 | (2006.01) |

(52) U.S. Cl.
CPC ........ B29B 17/0412 (2013.01); B29C 43/003 (2013.01); *B29B 2017/042* (2013.01); *B29B 2017/0468* (2013.01); *B29C 43/02* (2013.01); *B29C 43/52* (2013.01); *B29K 2001/12* (2013.01); *B29K 2105/26* (2013.01)

(58) Field of Classification Search
None
See application file for complete search history.

(56) References Cited

FOREIGN PATENT DOCUMENTS

| | | |
|---|---|---|
| EP | 267409 A1 | 5/1988 |
| EP | 2871035 A1 | 5/2015 |
| EP | 3538602 A1 | 9/2019 |
| FR | 2711079 A1 | 4/1995 |
| GB | 205463 A | 4/1924 |
| IT | PD20080180 A1 | 12/2019 |
| WO | 9417987 A1 | 8/1994 |

OTHER PUBLICATIONS

PCT International Search Report and Written Opinion dated Jan. 28, 2021 for related International Application No. PCT/IB2020/060555, from which the instant application is based, 9 pgs.
Yarsley et al., "Cellulosic Plastics", Iliffe Books Ltd, Jan. 1964, pp. 1-18.
Eyecare Business Pentavision, "Lets Talk Plastic" , Jan. 8, 2000, Available from eyecarebusiness.com, pp. 1.
Toray Advanced Composites, "The Benefit of Recycling Thermoplastic Composites" Apr. 13, 2018, pp. 1-6.
Bianchi, "Declaration of Facts and Documentary Evidence", written Mar. 19, 2024, pp. 1-2.
Mirigliani, "Declaration of Facts and Documentary Evidence" , written Mar. 19, 2024, pp. 1.
Santero, "Declaration of Facts and Documentary Evidence", written Mar. 21, 2024, pp. 1-2.
Walter, "Declaration of Facts and Documentary Evidence" , written Mar. 26, 2024, pp. 1-2.
"Notice of Opposition re European Patent No. 4065331", dated Mar. 28, 2024, pp. 1-13.

*Primary Examiner* — Robert J Grun
(74) *Attorney, Agent, or Firm* — Fredrikson & Byron, P.A.

(57) ABSTRACT

Method for production of articles and semi-finished products made of cellulose acetate, comprising the steps of recovering waste material consisting of cellulose acetate derived from previously made cellulose acetate articles and/or semi-finished products, distributing or positioning a mixture of at least one polymeric material inside a mould, heating and pressing the mixture inside the mould in order to form the articles or semi-finished products. The mixture is formed at least partially by the waste material consisting of cellulose acetate and the articles and/or semi-finished products may be subjected to a cooling and pressing step. The mixture is formed at least partially by fragments of cellulose acetate.

19 Claims, No Drawings

METHOD FOR PRODUCTION OF ARTICLES AND SEMI-FINISHED PRODUCTS MADE OF CELLULOSE ACETATE

RELATED APPLICATIONS

This application is a 35 U.S.C. 371 national stage filing from International Application No. PCT/IB2020/060555, filed Nov. 10, 2020, which claims priority to Italian Application No. 102019000022128, filed Nov. 26, 2019, the teachings of which are incorporated herein by reference.

The present invention relates to a method for production of articles and semi-finished products made of cellulose acetate using exclusively or at least partly waste material or processing by-product derived from previously made articles and/or semi-finished products. Preferably, the waste material used in the present invention is derived from the processing of semi-finished products made of cellulose acetate for the manufacture of frames for eyeglasses.

In the eyeglasses manufacturing field for some time it has been known to use cellulose acetate as the material for making end tips, side arms and front pieces of eyeglass frames.

Cellulose acetate is an acetate ester of cellulose obtained originally from cellulose which is reacted with acetic acid and acetic anhydride in the presence of sulphuric acid.

At least two methods are provided for the production of end tips, side arms and front pieces of eyeglass frames made of cellulose acetate. Both production methods involve the use of virgin cellulose acetate, namely cellulose acetate which has not been previously used in other production processes.

The first method, which is also the preferred one, involves cutting a semi-finished product, namely a sheet or board, of cellulose acetate using a pantograph with profiles corresponding to the shape of the end tips, the side arms and the front pieces which are to be obtained. Pantographs are numerical-control machines which may be programmed to perform different cuts on the sheets depending on the frame model to be made.

The end tips, side arms and front pieces thus obtained may undergo further successive machining steps depending on the aesthetic appearance of the frame to be obtained.

The cellulose acetate semi-finished product, namely the sheet, has a predetermined size and thickness and is obtained by means of one or more processes for rolling a mix of cellulose acetate.

If it is required to obtain a frame with varied colouring, the starting sheet may be obtained by mixing together mixes of cellulose acetate with different colours and rolling the blended mixes.

One drawback of this solution consists in the fact that the mixes of cellulose acetate with varied colours are complex to prepare and therefore have a particularly high cost.

Another drawback of this production method consists in the fact that, during cutting of the sheet of cellulose acetate and the successive processing steps, a large quantity of waste material is formed.

This waste material is not reused and forms waste which must be disposed of by means of predetermined procedures; these procedures result in an increase in the costs and the overall processing time.

A further drawback consists in the fact that the sheets or the mixes which are not used in the production process are kept in storage before being disposed of as waste material. This drawback results in a significant outlay of economic resources by the company.

The second production method involves the injection of a liquid or fluid polymeric material, for example cellulose acetate, inside a mould which has a shape corresponding to the shape of the frame to be made. This method is used in particular for frame models which must be produced in large numbers.

A first drawback of this further production method consists in the fact that it is not particularly suitable for being used for the manufacture of frames with varied colours. Therefore this production method is limited in particular to the production of mono-coloured frames.

If necessary, the frames obtained by means of this second method may be varnished subsequently; however, cellulose acetate is not particularly suitable for undergoing the successive varnishing steps and therefore the final aesthetic result may be of mediocre quality. A further drawback consists in the fact that different frame models must necessarily be made using different moulds.

This drawback results in this second production method being particularly unproductive in particular in the case where a small number of frames must be made.

Another drawback consists in the fact that the operator is unable to define a predefined program for distribution of the polymeric material inside the mould before the injection of the material.

The object of the present invention is to solve substantially the problems of the prior art and overcome the known drawbacks by providing a method for production of articles or semi-finished products made of cellulose acetate.

A particular task of the present invention is to provide a method for the production of articles and semi-finished products made of cellulose acetate whereby the cellulose acetate derived from previously made articles and/or semi-finished products may be recovered.

A further task of the present invention is to provide a method for the production of articles and semi-finished products made of cellulose acetate whereby the waste material or processing by-product derived from the processing of semi-finished products made of cellulose acetate may be recycled.

A further task of the present invention is to provide a method for the production of articles and semi-finished products made of cellulose acetate which has low costs compared to the methods known from the prior art.

A further task of the present invention is to provide a method for production of articles and semi-finished products made of cellulose acetate which allows a reduction of the warehouse stocks of the materials and the semi-finished products used in the production processes.

Another task of the present invention is to provide a method of the type described above which may be used for the production of various types of eyeglass frames which may comprise different colours or a set of colours.

A further task of the present invention is to provide a method of the type described above whereby it is possible manufacture articles with structural characteristics similar to those of the articles obtained using virgin cellulose acetate.

Another task of the present invention is to provide a method of the type described above whereby it is possible to produce cellulose acetate articles or semi-finished products using equipment and devices which are commonly used in the sector.

A further task of the present invention is to provide a method for production of articles and semi-finished products made of cellulose acetate which allows the definition of a predefined program for distribution of the material.

The aforementioned objects and tasks are achieved with a method for the production of articles and semi-finished products made of cellulose acetate according to claim 1.

The present invention relates to a method for production of articles and semi-finished products made of cellulose acetate.

In particular, the articles which may be obtained by means of the production method are preferably end tips, side arms and front pieces for eyeglass frames; alternatively the articles may be objects which are commonly used, such as combs, clips, fasteners and beauty accessories or wearable objects such as necklaces, bracelets, earrings and rings.

The semi-finished products which can be obtained with the production method according to the present invention preferably comprise sheets which are suitable for being cut and processed in order to produce end tips, side arms and front pieces of eyeglass frames.

However, with the method according to the present invention it is also possible to produce articles and semi-finished products which are different from those indicated above, without thereby departing from the scope of the present invention.

The method initially comprises a step of recovering waste material or material resulting from previously made cellulose acetate articles and/or semi-finished products. The material may also consist of a processing by product.

The waste material may comprise turnings, shavings and/or cuttings resulting from the processing of semi-finished products for the manufacture of end tips, side arms and front pieces of eyeglass frames or else end tips, side arms and/or front pieces of obsolete eyeglasses which must be disposed of.

Alternatively, the waste material may comprise semi-finished products in the form of sheets and/or pieces of sheet intended for the production of eyeglass frames.

However, the waste material may also be formed by a heterogeneous combination of the waste materials indicated above, namely turnings, shavings and cuttings and/or sheets or pieces of sheet and/or end tips, side arms and front pieces of obsolete frames.

The method also comprises the following steps:
distributing or positioning a mixture of at least one polymeric material inside a mould, the mixture being formed at least partially by the waste material consisting of cellulose acetate;
heating the mixture inside the mould;
pressing the mixture inside the mould in order to form the semi-finished products or articles;
cooling or pressing the articles or semi-finished products.

In accordance with the present invention, the mixture is formed at least partially by fragments of waste material consisting of cellulose acetate.

In the present invention, the term "mixture" is understood as meaning a set of solid components mixed together where each component maintains its essential chemical properties.

Upstream of the distribution step, the method may comprise also a step of grinding and/or crushing the waste material or processing by-product in order to obtain fragments of cellulose acetate; therefore, the mixture distributed or positioned in the mould is in solid form and is formed at least partially by the fragments of recovered cellulose acetate fragments.

In particular, the grinding step is performed preferably in the case where the waste material is formed by sheets, pieces of sheet or side arms, end tips and front pieces of frames.

The grinding and/or crushing step may be performed by means of equipment known from the prior art and not described in detail in the present description.

Suitably, the fragments of waste material obtained following the grinding and/or crushing step may have a particle size of between 1 mm and 50 mm.

The fragments resulting from the waste material and contained in the mixture may also have dimensions and/or particles sizes which are different from each other, as well as colours different from each other.

This particular feature is due to the fact that the fragments may be derived from different waste materials, as described above, and allows an article or a semi-finished product with a varied colouring and pattern to be obtained In this respect, the method may comprise a further step of screening and selecting the fragments of waste material, upstream of the step for distributing the mixture inside the mould, so as to use only the fragments which have the desired size and/or colouring.

For example, the selection of fragments depending on their size may be performed manually or by means of known optical devices or a sieve; in a similar manner, the selection of the fragments depending on their colour may be performed manually or by means of known optical devices.

The mixture may be formed at least partially by the fragments of cellulose acetate derived from waste material and mixed together with a polymeric material in the forms of granules and/or pieces.

The polymeric material may consist of virgin cellulose acetate in the form of granules and/or pieces; therefore, in this embodiment the articles and the semi-finished products are completely made of cellulose acetate.

The granules of cellulose acetate may be of the same type as those used for the production of the cellulose acetate articles and semi-finished products known from the prior art.

However, the fragments of waste material or processing by-product constitute a preponderant quantity in the mixture compared to the granules of virgin cellulose acetate and preferably the mixture comprises a weight amount of fragments of waste material ranging between 50% and 95%, and even more preferably between 70% and 95%, of the overall weight of the mixture.

For some applications, the weight amount of fragments of waste material contained inside the mixture may also be more than 95% in relation to the overall weight of the mixture.

The granules of virgin cellulose acetate which may be contained in the mixture have the function of a binder within the mixture, allowing the mixing together of the fragments of waste material during the heating and pressing steps.

The polymeric material mixed together with the fragments of waste material may also be different from virgin cellulose acetate, without thereby departing from the scope of the present invention.

Alternatively, the mixture may be formed exclusively by fragments of cellulose acetate derived from waste material; therefore, the weight amount of the fragments in this embodiment is equal to about 100%, taking into account the presence of any impurities.

During the distribution step the mixture containing the fragments of waste material is distributed inside a receiving cavity which has a predetermined shape corresponding to the shape of the article or the semi-finished product to be obtained. This distribution step is performed using the mixture at room temperature.

Suitably, the dimensions/particle size of the ground fragments may be selected upstream also depending on the dimensions and the configuration of the receiving cavity.

In a manner known per se the mould, in addition to the receiving cavity which is formed or made in a first portion, comprises another portion with a punch designed to press the mixture inside the cavity.

Advantageously, the receiving cavity may be formed in a tray. The tray may be removably positioned inside the mould or so as to form part of the mould.

In particular, the tray is intended to be removably positioned in the first portion of the mould; alternatively, the tray may form the first portion of the mould and is intended to be directly joined together with the portion of the mould comprising the punch.

Preferably, the distribution or positioning step is performed by means of distribution inside the tray of the mixture comprising the fragments of waste material and at room temperature.

Therefore, the distribution or positioning step of the present invention is performed with the mould open or not yet assembled, differently from that which occurs in injection-moulding. In this connection, the operator may perform manually the distribution and the positioning of the fragments of waste material inside the tray.

Advantageously, the distribution or positioning step may also be performed by positioning a template with a pre-defined profile inside the receiving cavity of the tray, before the heating and pressing steps.

In this way, the fragments and/or granules of polymeric material with predetermined colours and dimensions may be positioned in a predefined arrangement inside the tray so as to obtain subsequently a predefined pattern on the article or on the semi-finished product.

Preferably, the heating and pressing steps may be performed simultaneously using a press with heated surfaces. In particular, the first portion of the mould with the receiving cavity may be mounted on the bottom heated surface of the press, while the mould portion with the punch may be mounted on the top heated surface of the press.

In the embodiment where the first portion of the mould is formed by the tray the latter may be mounted directly on the bottom heated surface of the press by means of a mould-holder of the tray.

Advantageously, the heating and pressing steps may be performed with heating temperature values of between 120° C. and 170° C. and with pressure values of between 10 bar and 120 bar, depending on the pressing step.

Preferably, the temperature value is between 140° C. and 165° C. and the pressure value is between 20 bar and 100 bar, depending on the pressing step.

These operating conditions allow the mixture to pass from room temperature to the temperature for softening of the mixture, namely of the fragments of waste material and optionally granules of virgin cellulose acetate when present, so as to form a mass of malleable material.

This mass of malleable material undergoes simultaneously pressing in order to form the semi-finished products or articles.

Advantageously, the operating conditions used during the heating and pressing steps are such as to keep the temperature of the cellulose acetate below its melting temperature, namely at at least 175° C., so as to avoid deterioration thereof.

The cooling and pressing step is performed preferably in a further mould comprising a respective portion with a punch, for example by transferring the tray into the further mould; at the end of the pressing and heating steps the article or semi-finished product may be displaced or positioned in this further mould.

This further mould is mounted on another press different from the press with heated surfaces, in particular this press has a pair of surfaces with cooling system.

If the heating and pressing steps have been performed using the tray, the latter may be displaced into the first portion of the cooled further mould.

Alternatively, the tray containing the article or semi-finished product may be mounted directly on the bottom surface of the press with cooling system and be coupled together with the punch of the further mould.

During the cooling and pressing step, the temperature of the semi-finished product or article is cooled from the heating temperature down to room temperature. In this way the articles and the semi-finished products are stabilized.

This cooling and pressing step is useful for completing the production of the articles and the semi-finished products which must have given mechanical and structural characteristics.

At the end of the production process and preferably downstream of any cooling and pressing step, both the articles and the semi-finished products may undergo further processing steps so as to obtain the desired configuration of the finished article or the semi-finished product.

For example, in the case where the article is an end tip, a side arm or a front piece of an eyeglass frame, the further steps may comprise milling, curving and barrel-polishing in order to remove the sharp edges.

Advantageously, the articles and the semi-finished products obtained with the method according to the present invention may result in waste material which may be reused with the production method according to the present invention.

In fact, one of the advantages of the present invention consists in the fact that the cellulose acetate maintains its mechanical and structural characteristics following the recovery and reuse process, in particular owing to the particular operating conditions used, such as the working temperature.

The above description highlights therefore the advantages which can be obtained with the method according to the present invention compared to the conventional methods for the production of articles or semi-finished products made of cellulose acetate.

Firstly, the method allows the production of articles and semi-finished products made of waste cellulose acetate, i.e. cellulose acetate obtained from previously made cellulose acetate articles and/or semi-finished products.

As a result of this advantageous feature, therefore, the overall costs for the production of the articles and the semi-finished products may be substantially reduced and the waste material disposal step avoided.

This advantageous feature also results in a reduction in the warehouse stocks of materials and semi-finished products for the production of articles made of cellulose acetate.

Furthermore, the articles and the semi-finished products thus obtained may have varied patterns and colours and maintain the same structural and mechanical characteristics of the articles made entirely of virgin cellulose acetate.

With the production method according to the present invention it is possible to manufacture articles made of waste material using devices and machines which are widely known in the sector. Therefore the implementation of the present method does not require a dedicated plant.

The person skilled in the art, in order to satisfy specific needs, may make modifications to the embodiments described above and/or replace the elements described with equivalent elements, without thereby departing from the scope of the attached claims.

The invention claimed is:

1. Method for production of articles or semi-finished products made of cellulose acetate, comprising the following steps:
   recovering waste material consisting of cellulose acetate derived from previously made articles and/or semi-finished products;
   one or more of grinding and crushing the waste material in order to obtain solid fragments of cellulose acetate;
   distributing or positioning a mixture of at least one polymeric material inside a mold, said mixture being formed at least partially by the waste material consisting of the solid fragments of cellulose acetate;
   heating said mixture inside said mold;
   pressing said mixture inside said mold so as to form said articles or semi-finished products; and
   cooling the articles or semi-finished products.

2. The method according to claim 1, characterized in that said waste material comprises turnings, shavings and cuttings obtained from the processing of semi-finished products for the manufacture of end tips, side arms and front pieces of cellulose acetate eyeglass frames, the articles produced comprising end tips, side arms and front pieces of eyeglass frames, or wearable objects or objects for everyday use.

3. The method according to Claim 1, characterized in that said waste material comprises semi-finished products in the form of sheets or pieces of sheets for the production of eyeglass frames.

4. The method according to Claim 1, characterized in that said waste material comprises end tips, front pieces and side arms of obsolete eyeglass frames which must be disposed of.

5. The method according to claim 1, characterized in that said heating and pressing steps are performed simultaneously.

6. The method according to claim 5, characterized in that said heating and pressing steps are performed with temperature values of between 120°° C. and 170° C. and with pressure values of between 10 bar and 120 bar depending on the pressing step.

7. The method according to claim 1, characterized in that said distribution or positioning step is performed with the mold open or not assembled, said mixture being at room temperature.

8. The method according to claim 1, characterized in that said distribution or positioning step is performed by means of distribution of the mixture inside a tray, said tray being intended to be removably positioned inside the mold or to form a part of the mold.

9. The method according to claim 1, characterized in that said cooling step, if present, is performed by means of a further mold, separate from the mold in which the steps for heating and pressing said mixture are performed.

10. The method according to claim 1, characterized in that said mixture is formed by said fragments of cellulose acetate derived from waste material mixed together with a polymeric material.

11. The method according to claim 10, characterized in that said polymeric material consists of virgin cellulose acetate in the form of granules and/or pieces.

12. The method according to claim 11, characterized in that said mixture comprises a weight amount of fragments of waste material ranging between 50% and 95% in relation to the overall weight of the mixture.

13. The method according to Claim 1, characterized in that said mixture is formed exclusively by fragments of cellulose acetate derived from waste material.

14. The method according to Claim 1, characterized in that the fragments of cellulose acetate from waste material have dimensions and/or particle sizes and/or colours which are different there between.

15. The method according to Claim 1, characterized in that said waste material comprises turnings, shavings and cuttings obtained from the processing of semi-finished products for the manufacture of end tips, side arms and front pieces of cellulose acetate eyeglass frames, the articles produced comprising end tips, side arms and front pieces of eyeglass frames, or wearable objects or objects for everyday use.

16. The method according to claim 6, characterized in that said heating and pressing steps are performed with temperature values of between 140°° C. and 165° C.

17. The method according to claim 6, characterized in that said heating and pressing steps are performed with pressure values of between 20 bar and 100 bar depending on the pressing step.

18. The method according to claim 12, characterized in that said mixture comprises a weight amount of fragments of waste material ranging between 70% and 95% in relation to the overall weight of said mixture.

19. The method of claim 1, by which the articles or semi-finished products are configured to have a predefined pattern due to a predefined arrangement of the fragments in the mold.

\* \* \* \* \*